Sept. 8, 1964     M. MAYRATH     3,147,855
CARRIAGE AND SADDLE FOR CONVEYORS
Filed March 6, 1961
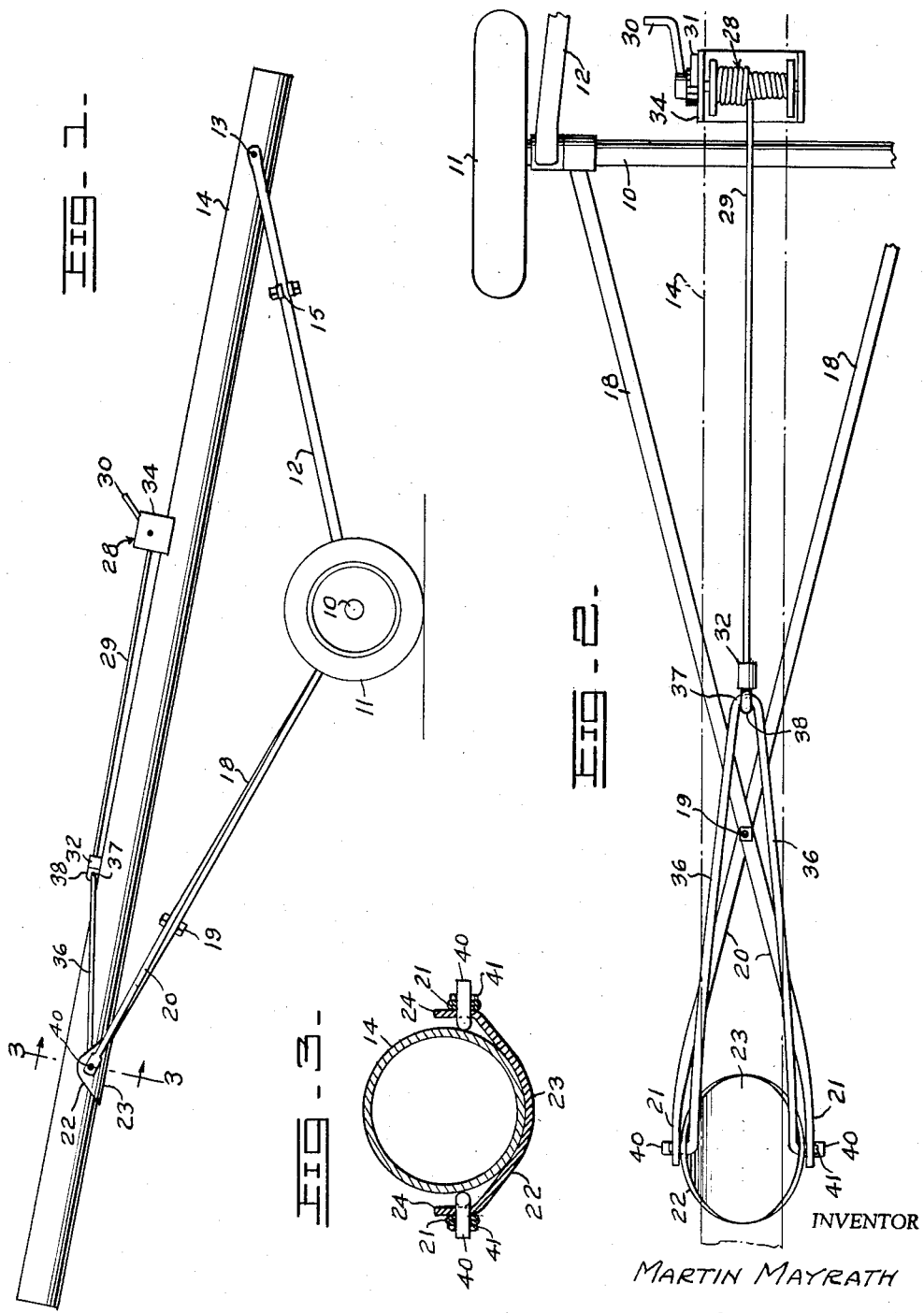
INVENTOR
MARTIN MAYRATH
BY *Homer L. Montague*
ATTORNEY

United States Patent Office 3,147,855
Patented Sept. 8, 1964

3,147,855
CARRIAGE AND SADDLE FOR CONVEYORS
Martin Mayrath, 10707 Lennox Lane, Dallas 29, Tex.
Filed Mar. 6, 1961, Ser. No. 93,603
6 Claims. (Cl. 198—233)

This invention relates to a carriage for elevating conveyors commonly employed for conveying and elevating grain and the like from a source to be discharged at a higher elevation.

It is the common practice in a mechanism of this character to support a trough or screw conveyor on a wheeled carriage to be transported wherever the conveyor is to be used. The carriage usually comprises a wheeled axle from which radius rods project at one side for connection at their free ends to the lower end of the conveyor trough or tube while supporting arms project from the axle structure at the opposite side thereof and are provided with means at their free ends to support the higher end of the conveyor trough or tube. Such supporting means may be, and commonly is, in the form of rollers which permit movement of the conveyor trough or tube relative to the ends of the supporting arms. The radius rods are anchored to the conveyor trough or tube and means is provided for changing the angularity between the radius rods and supporting arms to adjust the inclination of the conveyor. The adjusting means may be in the form of a winch mounted to provide for a pulling force between the radius rods and supporting arms to change the angularity therebetween. Where the conveyor merely rests on rollers or other supporting means carried by the supporting arms, the conveyor can bounce or vibrate relative to the supporting means, thus scraping, denting or otherwise causing damage to the conveyor trough or tube.

An important object of the present invention is to provide a novel common means for varying the angularity between the radius rods and supporting arms of a conveyor carriage and for exerting a downward force to maintain the conveyor trough or tube in firm engagement with the supporting means.

A further object is to provide supporting means carried by the supporting arms shown in the present instance as a saddle, and to provide means for exerting a pull on such saddle to slide it along the conveyor and to utilize a portion of the pulling force for holding the conveyor snugly in the saddle against bouncing or vibration relative thereto.

A further object is to provide means of the character referred to comprising a winch preferably carried by the conveyor tube or trough and connected to the saddle or other supporting member for transmitting a force thereto to move the latter endwise of the conveyor and to utilize a portion of the force to act downwardly on the conveyor to maintain it tightly in engagement with the saddle.

A further object is to provide a device of the character referred to wherein the means for transmitting force from the winch to the saddle conveys such force in two planes at a slight angle to each other, and to employ means at the angle between the two planes of force so that upon the transmission of a pull through the force transmitting means, resultant forces at the angle of the two planes of forces will exert a downward pressure against the conveyor to maintain it in tight engagement with the saddle.

Other objects and advantages of the invention will become apparent during the course of the following description.

In the drawing I have shown one embodiment of the invention. In this showing:

FIGURE 1 is a side elevation of the carriage showing a conveyor tube mounted thereon;

FIGURE 2 is an enlarged fragmentary plan view of a portion of the mechanism; and FIGURE 3 is an enlarged sectional view on line 3—3 of FIGURE 1.

Referring to FIGURES 1 and 2, the numeral 10 designates what may be a conventional axle structure wheeled as at 11 to provide for the portability of the apparatus from one point to another. The axle structure is provided with radius rods 12 projecting in one direction therefrom and connected as at 13 to a conveyor 14 shown in the present instance as the tubular type having a screw conveyor (not shown) therein. The connection 13 may be a pivot and obviously prevents endwise movement of the conveyor relative to the ends of the radius rods 12. These rods may be braced relative to each other by a conventional cross brace 15.

From the side of the axle structure opposite the radius rods, a pair of supporting arms 18 project rearwardly in converging relation so as to cross each other as shown in FIGURE 2, and the supporting arms at the crossing point are fixed to each other by a bolt 19. Beyond the crossing point, the rear ends of the arms 18 diverge as at 20 and have their rear ends turned and flattened to provide parallel portions 21. A saddle 22 extends beneath the tube 14 and has its central portion 23 curved to conform to the curvature of the tube 14. The saddle is provided with vertically extending ends 24 arranged at opposite sides of and slightly spaced from the tube 14 for a purpose to be described.

The mechanism for transmitting a force to the saddle 22 is shown in FIGURES 1 and 2. A windlass 28 has wound thereon one end of a cable 29 and the windlass may be hand-operated by a crank 30 held against turning movement in any adjusted position by a suitable ratchet mechanism 31. The rear end of the cable 29 is connected to a fitting 32 which, as shown in FIGURE 1, rests upon the top of the tube 14 between the windlass 28 and saddle 22. The windlass is carried by a frame 34 which is fixed in any suitable manner to the tube 14 and accordingly it will be apparent that operation of the crank 30 transmits a pull through the cable 29 to the fitting 32.

An elongated yoke 36 has a loop 37 at one end passing through an eye 38 connected to the fitting 32. The arms of the yoke 36, which may be of any stiff rod material, diverge rearwardly from each other and are sufficiently curved to permit them to straddle the tube 14. The free ends of the arms of the yoke 36 turn outwardly as at 40 to form a connection between the yoke and the ends 24 of the saddle and the ends 21 of the supporting arms 18. These elements may be maintained in position on the rod ends 40 in any suitable manner, for example by cotter pins 41.

*Operation*

It will be noted that the radius rods 12 and supporting arms 18 are connected in any suitable or conventional manner to the axle structure 10 to permit them to swing about the axle to assume different angular positions with respect to each other, such angularity being provided so that the conveyor may assume different inclinations to the horizontal according to the height to which the grain or other material is to be lifted. It also will be noted that the plane of the arms of the yoke 36 is at a slight angle to the plane of the free end of the cable 29 and that the fitting 32, which engages the top of the tube 14, is at the intersection of such planes.

Assuming that the left-hand or rear end of the tube 14 is to be elevated, the operator will turn the crank 30 to wind the cable 29, thus causing the fitting 32 to move downwardly or to the right along the tube 14, transmitting a pull through the yoke 36 to move the saddle 22 to the right. This operation decreases the angularity between the radius rods 12 and supporting arms 18 and elevates the left-hand or rear end of the tube 14.

As previously stated, it is desirable to prevent the tube from vibrating or bouncing against the supporting means therefor carried by the rear ends of the arms 18. Most of the force transmitted through the cable 29 and yoke arms 36 will be carried to the saddle 22 to effect movement thereof in the manner stated. Due to the angularity of the planes of the cable 29 and yoke arms 36, however, there will be a resultant force acting downwardly on the fitting 32, and this force is utilized for holding the tube 14 firmly in the saddle 22 against any vertical movement relative thereto. Thus the bouncing of the tube in the saddle is prevented. With a typical conveyor unit and with the parts arranged approximately at the angle shown in FIGURE 1, an 88 lb. pull on the cable 29 will result in a downward force of approximately 22 lbs. on the tube to maintain it in firm engagement with the saddle 22. In any adjusted position of the parts, the resultant force acting downwardly on the tube 14 will be sufficient to maintain the firm engagement of the tube 14 with the saddle 22.

Due to the weight of the conveyor tube and the parts therein, there will always be substantial gravitational force tending to move the saddle 22 and the adjacent ends of the arms 18 downwardly. This weight of the parts, in any adjusted position thereof, maintains the cable 29 under tension so that the resultant forces will always be present to hold the tube firmly in the saddle.

To lower the rear or left-hand end of the tube 14, the ratchet device 31 will be released and the handle 30 will be turned to back off the cable 29. As soon as the pull on the cable decreases below the point necessary to support the saddle and the weight thereon in the previously adjusted position, the saddle will slide to the left in FIGURE 1 relative to the tube 14. Thus the rear ends of the arms 18 and the corresponding end of the tube 14 will lower to whatever height is desirable.

The saddle 22, of course, is only one form of supporting device which may be used for the tube and any means may be employed, including rollers, for supporting the tube relative to the arms 18. Whatever means is employed permits axial movement of the tube relative to the supporting means to vary the angularity between the radius rods 12 and arms 18 to vary the inclination of the conveyor, and the force transmitting means will act to maintain tight engagement between the tube 14 and whatever type of supporting means may be employed.

While relatively rigid yoke arms 36 are employed, it will be apparent that these elements may be in the form of cables or any elements adapted to be placed under tension for the performance of the intended functions of the mechanism. The arms 18 are preferably crossed and bolted together as at 19 in the interest of increased rigidity in the frame structure.

It is to be understood that the form of the invention shown and described is to be taken as a preferred example of the same and that various changes in the shape, size, and arrangement of the parts may be made as do not depart from the spirit of the invention or the scope of the appended claims.

What is claimed is:

1. An elevating conveyor mechanism comprising an elongated conveyor, a carriage for said conveyor comprising a wheeled axle, radius rods projecting in one direction from said axle and connected to one end portion of said conveyor, and a supporting structure for the other end portion of said conveyor comprising supporting arms connected at one end to said axle and a supporting saddle connected to the other ends of said arms and on which said conveyor rests, means for transmitting a force to said supporting structure at a point remote from said axle to vary the angularity between said radius rods and said supporting arms to adjust the inclination of said conveyor, said force transmitting means comprising a pair of force transmitting elements under tension arranged at a slight angle to each other and one of which force transmitting elements is connected to said remote point on said supporting structure, and a fitting connected between said force transmitting elements and resting upon the top of said conveyor whereby the force transmitted to said supporting structure includes resultant force acting downwardly from said fitting to said conveyor to maintain the latter in firm engagement with said supporting saddle.

2. An elevating conveyor mechanism comprising an elongated conveyor, a carriage for said conveyor comprising a wheeled axle, radius rods projecting in one direction from said axle and connected to one end portion of said conveyor, and a supporting structure for the other end portion of said conveyor comprising supporting arms connected at one end to said axle and a supporting saddle connected to the other ends of said arms and on which said conveyor rests, a winch carried by said conveyor intermediate the ends thereof, and force transmitting means connected between said winch and said supporting structure at a point remote from said axle to vary the angularity between said radius rods and said supporting arms to adjust the inclination of said conveyor, said force transmitting means comprising a cable wound at one end about said winch and extending along the top of said conveyor and a force transmitting element extending from said cable at a slight downward angle thereto away from said axle and connected to said remote point on said supporting structure, and a fitting connecting said cable and said force transmitting element and resting on the top of said conveyor, the tensioning of said cable and said force transmitting element at the angularity therebetween generating a resultant force acting through said fitting against the top of said conveyor to maintain it in firm engagement with said supporting saddle.

3. An elevating conveyor mechanism comprising an elongated conveyor, a carriage therefor comprising a wheeled axle, radius rods projecting in one direction from said axle and connected to one end portion of said conveyor, supporting arms connected at one end to said axle and extending therefrom in the other direction, a supporting saddle carried by the other ends of said supporting arms and having a central portion transversely of the conveyor shaped to fit and support the latter, force generating means carried by said conveyor, and pull transmitting means connected between said force generating means and said saddle, said pull transmitting means comprising a pair of elements one of which extends from said force generating means along the top of said conveyor and the other of which extends slightly downwardly relative to said one element to form a slight angle therewith and connected to said saddle, and a fitting connected between said pull transmitting elements at the angle therebetween and resting on the top of said conveyor whereby the pull transmitted through said elements has a resultant force acting downwardly through said fitting against said conveyor to maintain it in firm engagement with said saddle.

4. An elevating conveyor mechanism comprising an elongated conveyor, a carriage therefor comprising a wheeled axle, radius rods projecting in one direction from said axle and connected to one end portion of said conveyor, supporting arms connected at one end to said axle and extending therefrom in the other direction, a supporting saddle carried by the other ends of said supporting arms and having a central portion transversely of the conveyor shaped to fit and support the latter, a winch mounted on the top of said conveyor at a point remote from said saddle in the direction of said radius rods, a cable connected at one end to said winch and extending along the top of said conveyor in the direction of said saddle, a pull transmitting element extending from said cable at a slight angle downwardly therefrom and toward said saddle and connected thereto, and a fitting connecting said cable and said element and resting on the top of said conveyor whereby the transmission of a pull between said cable and said element has a resultant force causing said fitting to act downwardly on said conveyor to maintain it in firm engagement with said saddle.

5. A mechanism according to claim 4 wherein said pull transmitting element comprises a yoke having arms diverging toward and connected to said saddle on opposite sides of said conveyor, said yoke having a looped end adjacent and connected to said fitting.

6. A mechanism according to claim 4 wherein said pull transmitting element comprises a yoke of rod material having arms diverging toward said saddle on opposite sides of said conveyor, the ends of said arms being turned outwardly through said saddle and through the adjacent ends of said supporting arms to constitute means for connecting such elements to each other, said yoke having a loop adjacent and connected to said fitting.

References Cited in the file of this patent
UNITED STATES PATENTS

| | | |
|---|---|---|
| 342,064 | Butler | May 18, 1886 |
| 2,646,157 | Belt | July 21, 1953 |
| 2,702,113 | Babrowski | Feb. 15, 1955 |